Figure 1:
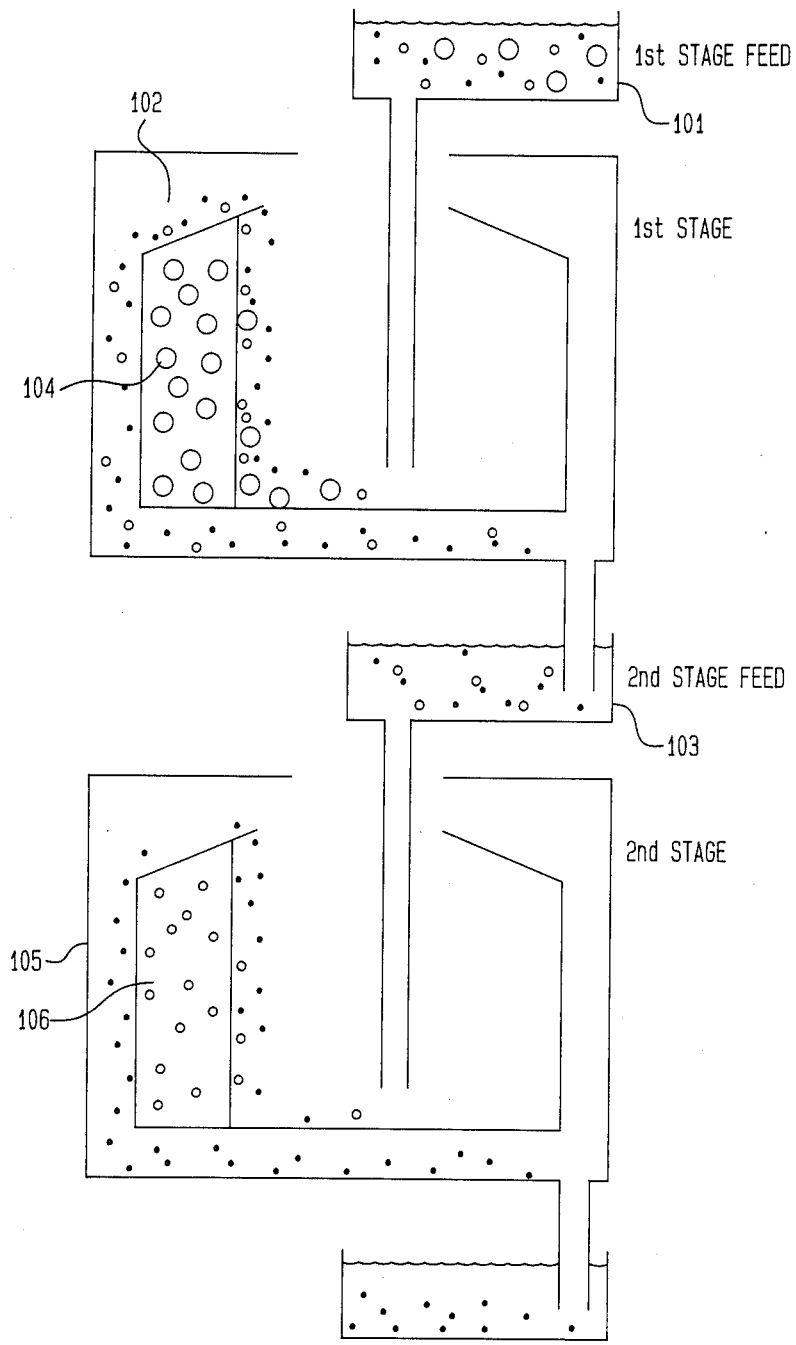

United States Patent [19]

Pober et al.

[11] Patent Number: 4,781,671

[45] Date of Patent: Nov. 1, 1988

[54] SYSTEM FOR CLASSIFICATION OF PARTICULATE MATERIALS

[75] Inventors: Richard L. Pober, Waban; Bruce E. Novich, Lexington, both of Mass.

[73] Assignee: Ceramics Process Systems Corporation, Cambridge, Mass.

[21] Appl. No.: 28,891

[22] Filed: Mar. 28, 1987

[51] Int. Cl.⁴ .................................................. B04B 5/00
[52] U.S. Cl. .......................................... 494/31; 494/35; 494/37; 494/32; 494/7; 209/5
[58] Field of Search .................. 494/31, 32, 35, 34, 494/37, 44, 7, 10, 84; 209/5; 210/787, 512.1, 195.1, 202, 799, 689

[56] References Cited

U.S. PATENT DOCUMENTS

| | | | |
|---|---|---|---|
| 2,085,537 | 6/1937 | Lyons | 494/32 |
| 2,467,402 | 4/1949 | Pascal | 494/35 |
| 3,334,516 | 8/1967 | Cedrone | 210/512.1 |
| 3,487,003 | 12/1969 | Baillie et al. | 210/195.1 |
| 3,677,405 | 7/1972 | Kieth, Jr. | 210/202 |
| 4,299,353 | 11/1981 | Bruning et al. | 494/10 |
| 4,421,651 | 12/1983 | Burkholder et al. | 210/689 |

Primary Examiner—Robert W. Jenkins
Assistant Examiner—J. Dwight Poffenberger, Jr.
Attorney, Agent, or Firm—Bradley N. Ruben

[57] ABSTRACT

Commercial wide size distribution powders are size classified into precise size fractions by means of a controlled, semi-continuous, multi-stage centrifugal classification system. The system has utility for a wide range of colloidal materials. The throughput of the semi-continuous process is higher than that of batch processes, and the semi-continuous process produces narrow size ranges and optimum yields.

13 Claims, 11 Drawing Sheets

0.1 μm – 3.0 μm SiAlON

—0.1μm SiAlON

SYSTEM FOR CLASSIFICATION OF PARTICULATE MATERIALS

FIELD OF THE INVENTION

This invention relates to centrifugal size classification of particulate matter, and in particular, to a method for obtaining narrow size distribution separation of colloidal particulate materials.

BACKGROUND ART

Advances in ceramic processing have permitted the replacement of various components of electrical and mechanical equipment with sintered ceramic parts. Ceramics have found widespread use in electronic components, cutting tools, and to a lesser degree, as structural substitutes for metals. However, the properties exhibited by ceramic materials are determined by the sintered microstructure, and under current processing systems the properties can be highly variable, depending in large part upon the quality of the starting powder, and especially the size distribution of the particles.

Ceramic structures are typically manufactured by packing powders to form a so-called "green body" that is subsequently sintered at high temperature to yield the ceramic material. At present, commercially available powders have large size distributions, typically from less than 0.5 micrometers to about 10 micrometers. Because of such wide size distributions, orderly packing of powders into green bodies has been difficult, and relatively high sintering temperatures have been required. Consequently, sintered microstructures and properties such as shrinkage variability and surface finish have not been well controlled. Accordingly, there exists a need for a system of producing narrow size fraction powders.

The use of centrifugation for size classification (separating particulate matter into size fractions) is known in the art. See generally Perry, *Chemical Engineers' Handbook*.

Separating powders into narrow particle-size ranges is accomplished through sedimentation. Sedimentation rate is given by Stokes' law of settling (Ex. 1):

$$v = h/t = \frac{Kr^2 g(\rho_p - \rho_m)}{\eta}$$

where $v$ = a particle's settling velocity, $h$ = the distance through which the particle settles, $t$ = the time required for the particle to settle through distance $h$, $r$ = the particle radius, $g$ = acceleration due to gravity, $\rho_p$ = particle density, $\rho_m$ = density of the medium, $\eta$ = liquid viscosity, and $K$ = the particle-shape factor (2/9 for a sphere), which takes into account both a particle's volume and its cross-sectional area.

The sum of a medium's buoyant force and the drag on a submicrometer particle makes simple gravitational settling time-consuming and tedious, and therefore uneconomical. Increasing the settling forces through centrifugal sedimentation speeds settling. Because a particle's terminal velocity is proportional to the square of its size, large particles settle through a medium considerably faster than do smaller particles, allowing easy separation. For centrifugal separation, the Svedberg-Nichols modification of Stokes' law is applicable (Eq. 2):

$$t_{sec} = \frac{1/K \cdot \eta \ln(x_2/x_1)}{\omega r^2 (\rho_p - \rho_m)}$$

where $t$ = the time required for a particle to settle through a distance $x_2 - x_1$, for $x_2$ = the rotating radius of the centrifuge to the end point of the particle's travel path and $x_1$ = the rotating radius of the centrifuge to the beginning point of the particle's travel path; $w$ = angular velocity in radians/sec.

Under traditional approaches, a specific particle-size classification ("cut") is achieved by first calculating the angular velocity and residence time required to force particles larger than the largest desired size out of the dispersion to form a sediment on the wall. The dispersion is placed in a centrifuge bowl and then centrifuged under these calculated conditions, and the resulting overflow, containing only particles finer than the upper limit of the desired increment, is decanted. The overflow is then processed in a fashion similar to that used for the original dispersion, so that all particles larger than the lowest size desired are spun out of suspension onto the centrifuge wall. This second sediment consists of particles within the desired size range and is therefore retained.

This "batch" centrifugation of the prior art is not adapted for production of narrow size distribution powders on a commercial scale. The batch process has insufficient throughput, and does not produce an optimally narrow size distribution powder. This is in part because at the beginning of each centrifugation procedure, particle distribution in the dispersion is random, so as particles within the desired size range are forced out of suspension, smaller particles in their path are dragged along with them, into the sediment. There exists a need for a carefully controlled system for generating narrow size distribution powders. Such powders would find widespread use and satisfy a variety of long felt needs in forming high-performance ceramics. A further use for narrow size distribution powders is for fillers in conjunction with ferrite-ceramic compositions.

DISCLOSURE OF INVENTION

In accordance with the present invention, commercially available wide size distribution colloidal powders are separated into precise size fractions in a controlled, semi-continuous, multi-stage centrifugal classification process. The system has utility for a wide range of colloidal particulates. The term "colloidal" in this description and in the following claims is to be understood as including particulates, liquid droplets, and vapor bubbles that are in suspension form. The throughput of the semi-continuous system is higher than that of batch processes, and the semi-continuous system produces narrow size ranges and optimum yields. With the system of this invention, the size range of the particulates can be carefully controlled. Tolerances of ±0.05 micrometers mean particle size and a surface area tolerance of ±0.5 m²/g are readily obtainable.

The present invention produces precise size fractions, or "cuts," using a process of "continuous flow" centrifugation, in which a rotating centrifuge basket is first filled with fluid, forming a static layer of liquid. Dispersion is then introduced into the system, and is classified according to Stokes' law. In a preferred embodiment of the invention, closed-loop feedback control and continuous monitoring of process parameters are provided. In components may be substituted, and adjustments made accordingly.

FIG. 1 is a sectional view of a two-stage system in accordance with the present invention. The figure shows a view of particle distributions in a two-stage classification system. For simplicity, only three particle sizes are shown. First stage feed 101 contains particles of all three sizes. The two smaller size fractions are removed from suspension as overflow 102 from stage one, forming second stage feed 103, and leaving the largest size particles in first stage sediment 104. The smallest size particles are removed from suspension as stage two overflow 105, leaving the intermediate size particles in stage two sediment 6.

Figure 2:
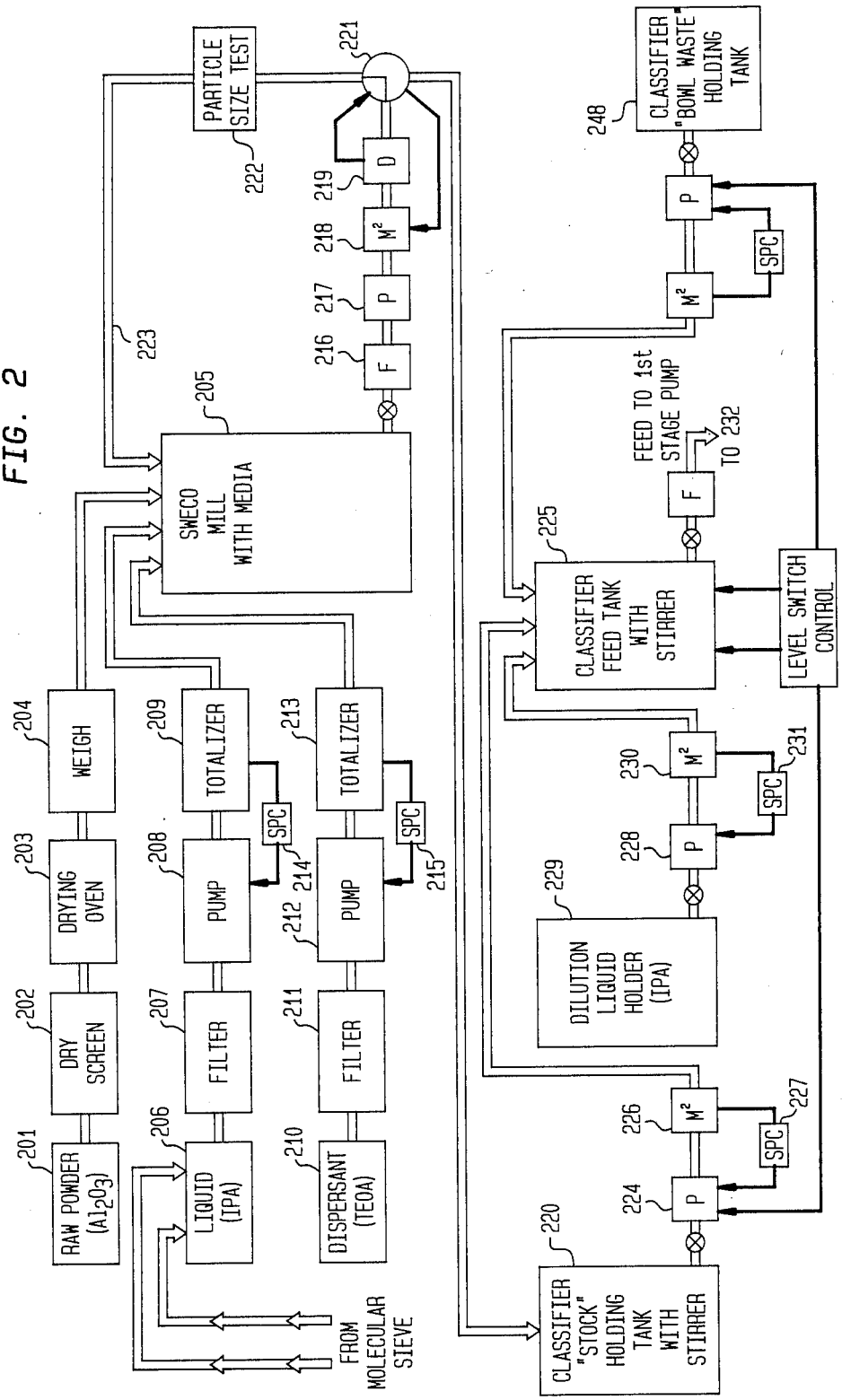
Figure 3:
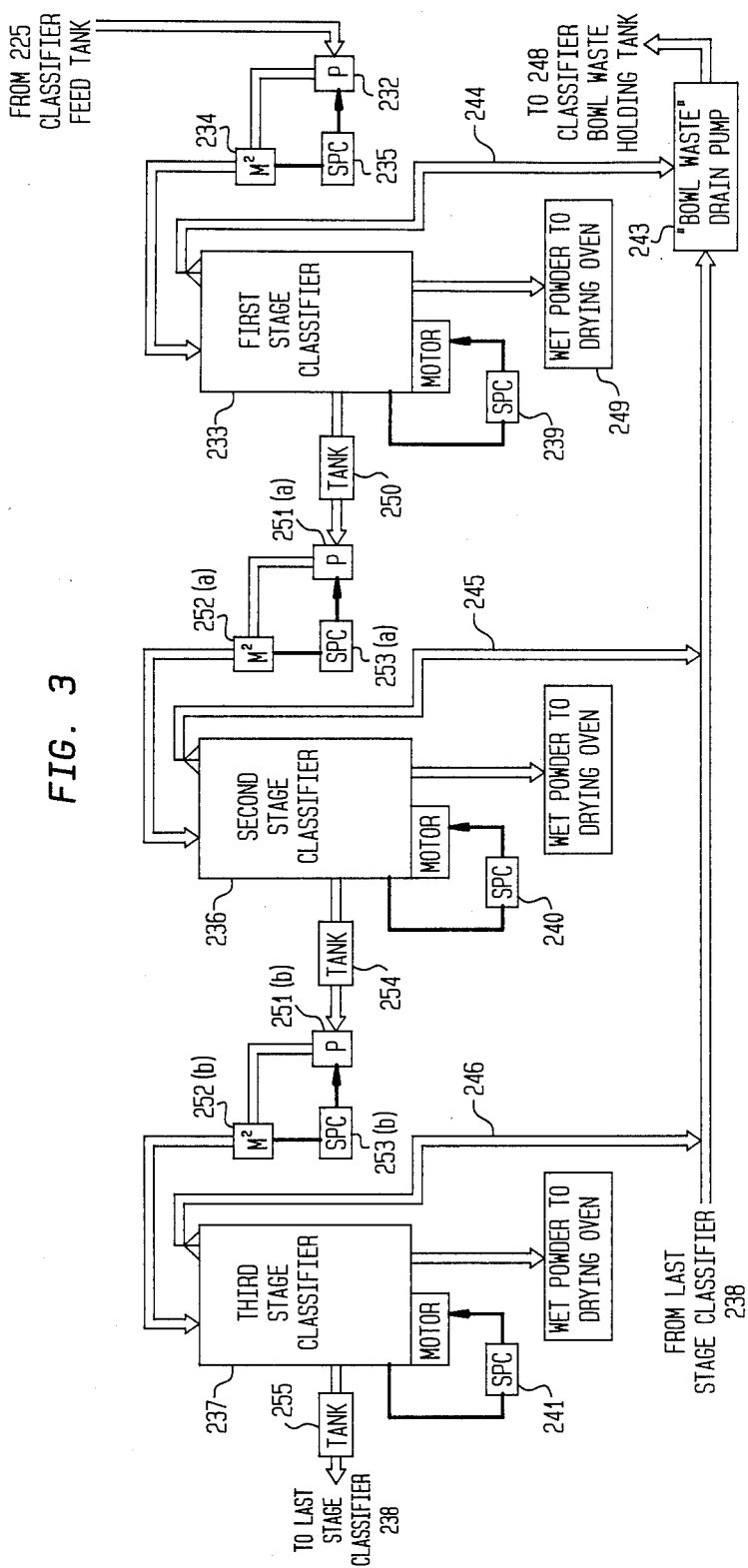
Figure 4:
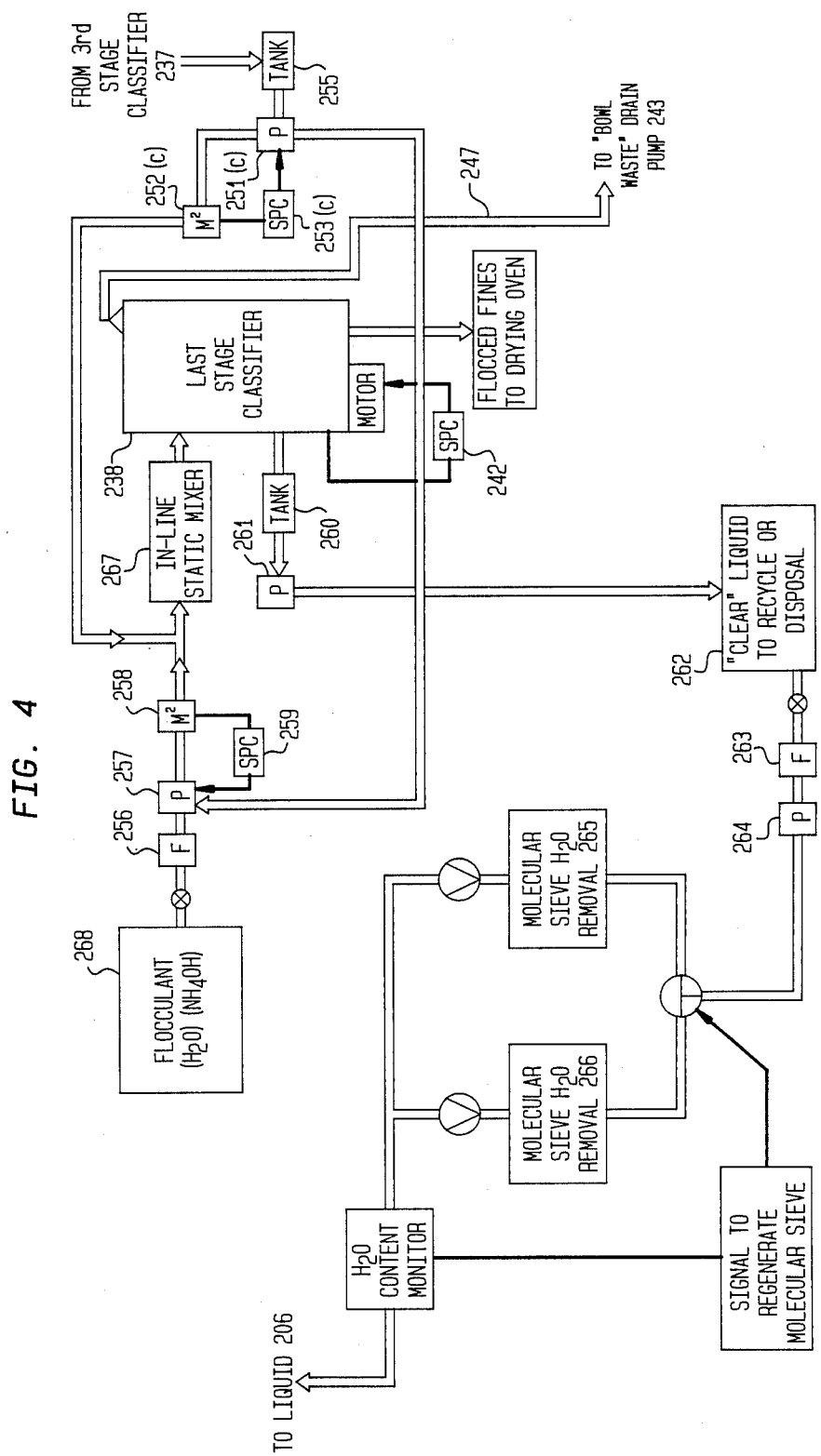

FIGS. 2–4 are schematic diagrams of a multi-stage semi-continuous system for classification of particulates in accordance with the present invention. In FIG. 2, commercial, "raw" powder 201 is passed through screen 202, oven 203, and weighing device 204, and fed to dispersion device 205, preferably a Sweco mill (available from Sweco, Inc., 6033 E. Bandinin Blvd., P.0. Box 4151, Los Angeles, Calif. 90051) with media. Liquid 206 is passed through filter 207, and driven by pump 208 into totalizer 209 and in turn to dispersion device 205. A preferred liquid for use with alumina is isopropyl alcohol or water, and a preferred dispersant such as Narlex LD-45 210 is fed through filter 211, pump 212, and totalizer 213, and then into mixing device 205. Setpoint controller 214 communicates with totalizer 209 and controls pump 208, while setpoint controller 215 communicates with totalizer 213 and controls pump 212. The dispersion of liquid, dispersant, and particulates then is fed through filter 216 by pump 217, and past feedback control devices 218 and 219 (which monitor mass flow rate, temperature, specific gravity, and viscosity). The dispersion is admitted to classifier stock holding tank 220 through valve 221 when appropriate conditions are indicated by monitoring devices 218 and 219.

The mixing of liquid, dispersant, and powder is a critical step in the classification process. The particles are not comminuted, so as to avoid increasing irregularities in particle shape. Powder, liquid, and dispersant are added to the dispersion device in a selected order at appropriate stages. Dispersion is conducted for a predetermined time, typically about 6 hours, under controlled speed and temperature conditions. Monitoring devices 218 and 219 periodically measure parameters indicative of the dispersion quality of the mixture, and mixture samples are returned to dispersion device 205 from particle size test stage 222 along line 223.

The stock suspension in tank 220 is pumped by pump 224 to classifier feed tank 225. The output of pump 224 is monitored by monitoring device 226 and controlled by controller 227. Stock suspension input to tank 225 is stirred and diluted with dilution fluid pumped by pump 228 from the tank 229. The output of pump 228 is monitored by monitoring device 230 and controlled by controller 231. A preferred dilution fluid for alumina is water, typically diluted at the rate of three parts liquid to one part stock. The diluted suspension is referred to as classifier feed suspension. Classifier feed suspension is then pumped by pump 232 to first stage classifier 233, shown in FIG. 3. The output of pump 232 is monitored by monitoring device 234 and controlled by controller 235. Monitoring device 234 is a commercially available unit which measures density and temperature and mass flow rate. Typical flow rates into the first stage are approximately 0.4 kilograms per minute. Classifiers 233, 236, 237, and 238 are commercially available centrifuge devices modified with a tachometer and commercially available setpoint controllers 239, 240, 241, and 242. Classifiers 233, 236, 237, and 238 are typically operated at a maximum speed of approximately 6000 rpm.

In a preferred embodiment of the present invention, each centrifuge is activated and then filled with liquid (for example, water for alumina powder) prior to the introduction of feed dispersion, as discussed in our above referenced co-pending application, Ser. No. 28,757. Classifier 233, for example, is activated, then "primed" with water before feed is pumped from tank 225. After feed is introduced, classifier 233 is operated at speed and feed rate conditions calculated to yield the desired particle size in the centrifuge basket. The centrifuge is operated for a predetermined time, or until sufficient separation is observed. Classifier 233 is then shut down, and bowl waste is removed by pump 243 along lines 244–247 to holding tank 248. Bowl waste can contain significant amounts of material concentrated in a particular size fraction. Wet powder 249 is then removed from the centrifuge basket. During centrifugation, particles smaller than the minimum size desired in the first stage basket ("fines") are drained from overflow into tank 250, from which they are pumped by pump 251 to second stage classifier 236. The flow rate is controlled by a feed regulation system, made up of pump 251(a) which is monitored by monitoring device 252(a) and controlled by setpoint controller 253(a). Second stage 236 operates in the same fashion as does first stage 233, as do third stage 237 and fourth stage 238. Similarly, "fines" from overflow tanks 254 and 255 are pumped to classifiers 237 and 238 by means of pumps 251(b) and 251(c), respectively, monitored by monitoring devices 252(b) and 252(c) and controlled by set point controllers 253(b) and 253(c). However, it will be understood that each succeeding classifier stage separates out a range of particles having a smaller mean diameter than the range of the preceding stage. Each succeeding stage must therefore operate at a lower mass flow rate and higher rpm range. The last stage classifier is fitted with an in-line static mixer 267 in which the fines suspension is mixed with a flocculant to facilitate fines recovery.

The multiple classifier stages thus operate in cascaded fashion, with each succeeding stage classifying the fines of the previous stage, and with tanks 250, 254, and 255 functioning as accumulators to buffer output rates to feed rates. Although in this particular embodiment, four classification stages are envisioned, the actual number of stages may vary, depending upon application. Optionally, the particles which are so small as to remain in suspension after passage through a particular classifier can be flocculated out and the liquid remaining can be recycled through the process. One means for accomplishing this is illustrated in FIG. 4. Flocculant, for example, $H_2O$ and $HNO_3$ (or water and Corcat P600, a cationic polymer, available from Virginia Chemicals Co.) from tank 268 is filtered with filter 256, then pumped by pump 257 through the in line static mixer 267 into the last stage classifier 238. The flow rate is monitored by monitor 258 and controlled by set point controller 259. The liquid passing out of the classifier, now particle free, is collected in overflow tank 260 and pumped by pump 261 to holding tank 262. It is filtered by filter 263, and pumped by pump 264 through molecular sieves 265 and 266 where the water is removed, leaving liquid which is ready to be pumped back to reuse as liquid 206, shown in FIG. 2.

EXAMPLES

EXAMPLE 1

Figure 5:
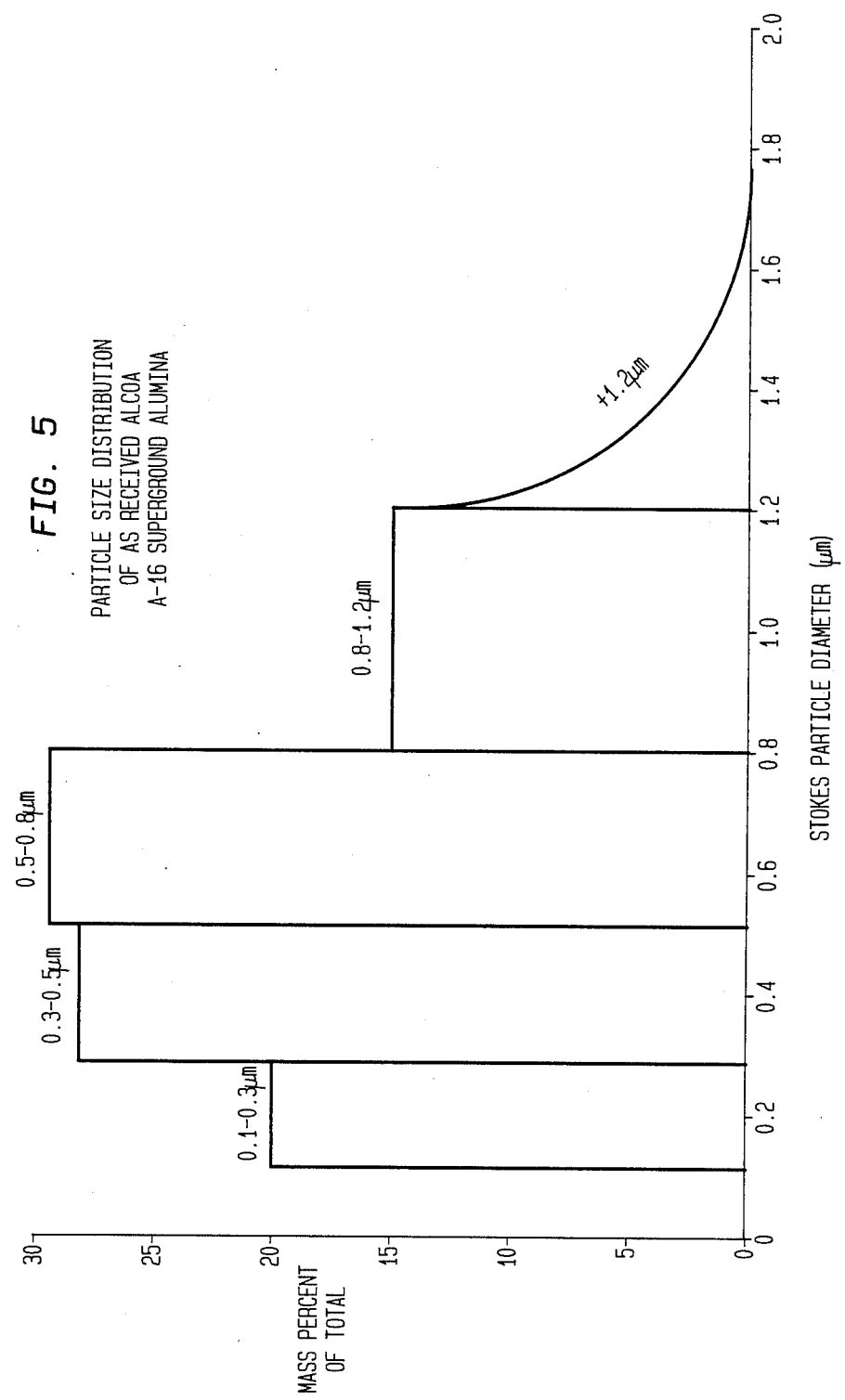

A four-stage classifying system was first primed with one residence volume of water. $Al_2O_3$ (60 weight percent) A-16 superground from Aluminum Company of America, Pittsburgh, Pa., was mixed with water (39.25 weight percent) and the dispersant, a polymeric polyeletrolyte sold under the brand name Narlex LD-45 (0.75 weight percent suspension basis). Narlex LD-45 can be obtained from National Starch & Chemical Corp., Bridgewater, N.J. 08807. This mixture was milled, filtered, then pumped into the classifier feed tank. The starting size distribution range is shown in FIG. 5. The feed suspension was then pumped at 1.0 kg/min into the first stage classifier, operating at 973 rpm which resulted in the removal of the particles larger than 1.2 micrometers from the feed stream. The particles were collected in a bowl.

Figure 6:
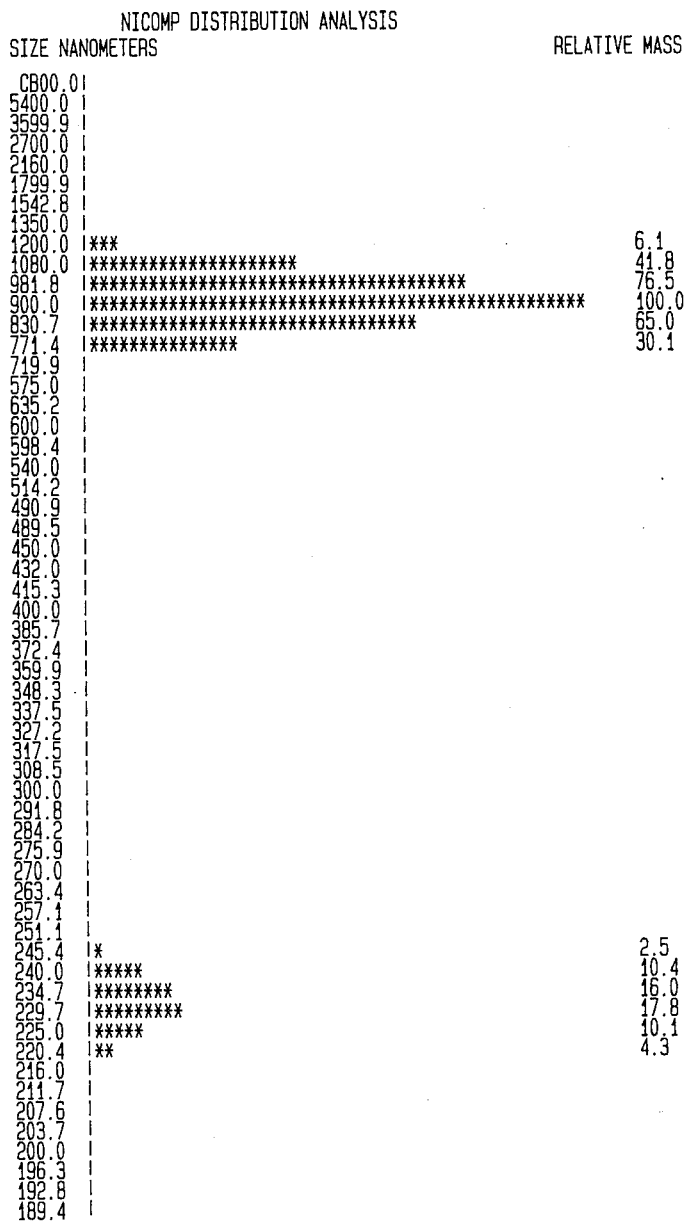

Suspension containing particles smaller than 1.2 micrometers was pumped at 0.850 kg/min into the second stage classifier operating at 1268 rpm. Here a separation of particles of 0.8-1.2 micrometers with a specific surface area of 7.6 $m^2/g \pm 0.5$ $m^2/g$, calculated for over 150 production runs was achieved. Actual size distribution is shown in FIG. 6.

Figure 7:
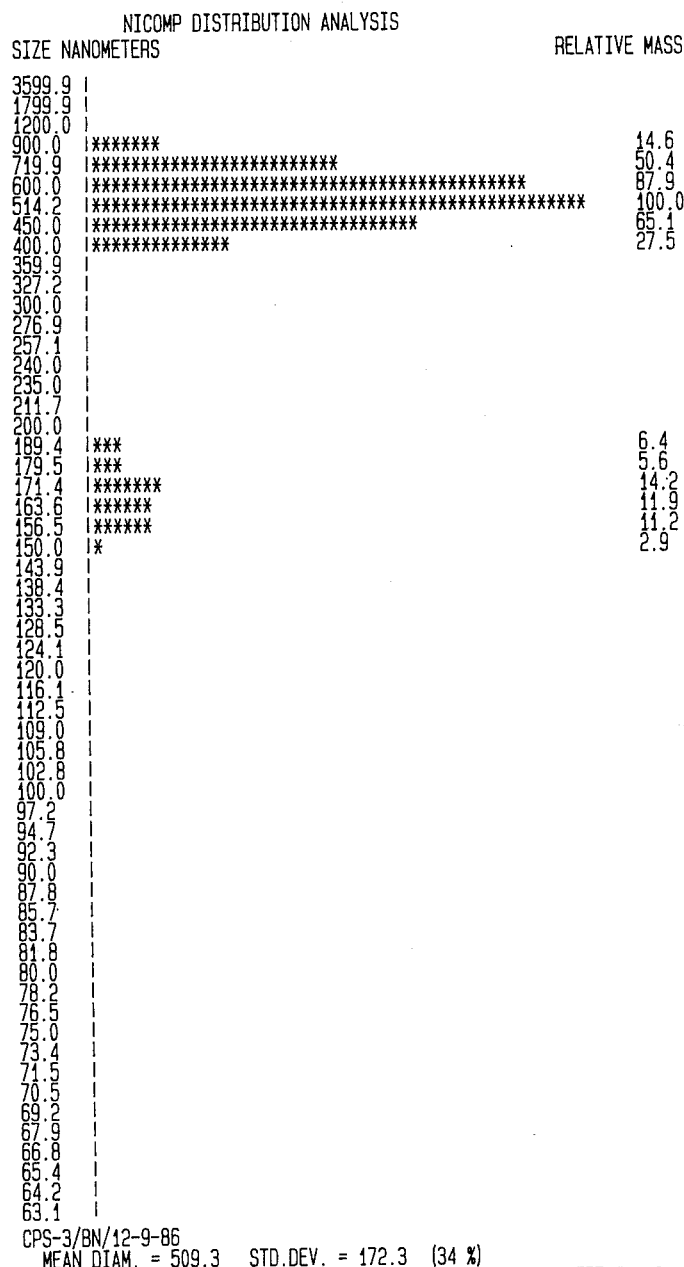
Figure 8:
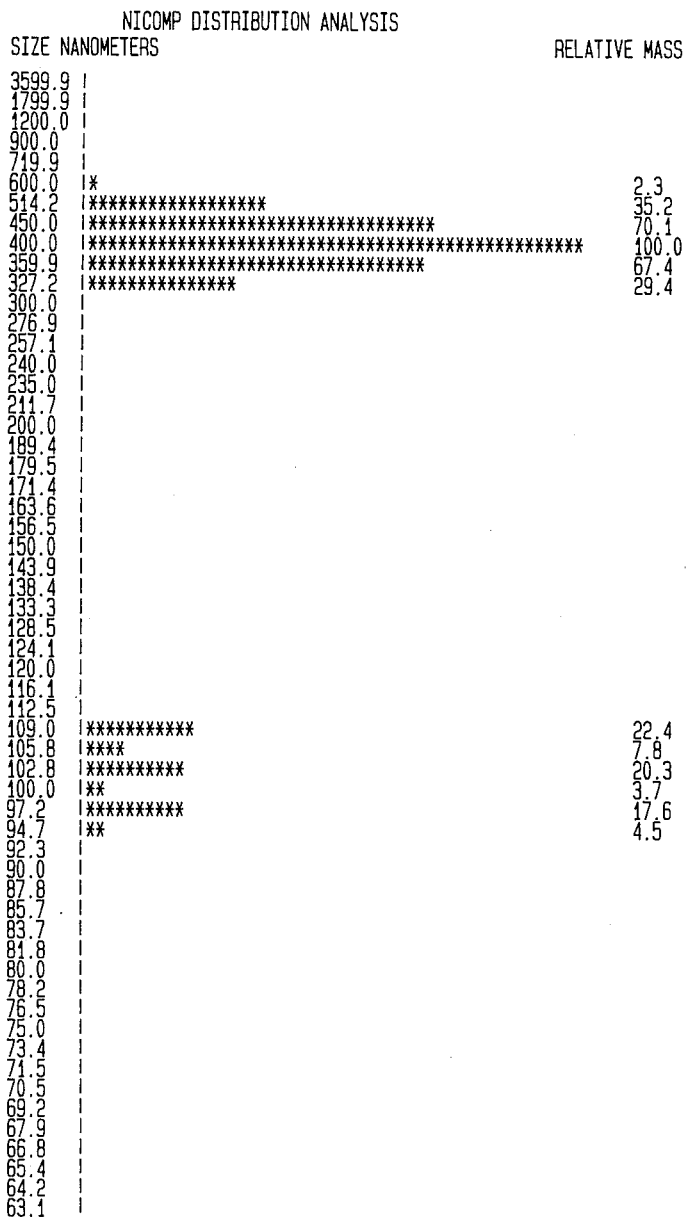

Liquid containing particles smaller than 0.8 micrometers was pumped at 0.760 kg/min, into the third stage classifier operating at 1942 rpm. Here a separation of particles of 0.5-0.8 micrometers, with a specific surface area of 9.56 $m^2/g \pm 0.5$ $m^2/g$, calculated over 150 production runs was achieved. The actual size distribution of these particles is shown in FIG. 7. Particles smaller than 0.5 micrometers were pumped at 0.506 kg/min, into the fourth stage classifier operating at 2700 rpm. Here a separation of particles of 0.3-0.5 micrometers, with a specific surface area of 11.5 $m^2/g \pm 0.5$ $m^2/g$, calculated over 150 production runs was achieved. FIG. 8 shows the actual size range of these particles. Particles smaller than 0.3 micrometers which remained in suspension were pumped through a static T-mixer with a dilute nitric acid solution to bring the suspension stream pH to $3 \pm 1$. The resulting flocculated suspension was introduced into a fifth stage classifier at 0.45 kg/min and 2700 rpm, where all remaining particles were removed.

The type of system described above could be scaled up to classify a large volume of material rapidly, for commercial production, i.e., up to about one metric ton per hour.

EXAMPLE 2

Figure 10:
Figure 11:
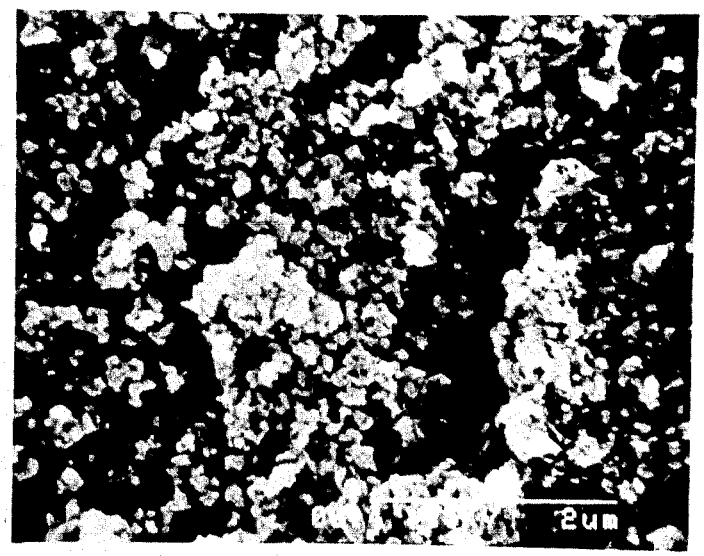

A classification system similar to the one described in Example 1 was used, except that SiAlON was used instead of alumina. The system configuration and milling procedures were the same for SiAlON as for the Alumina. The SiAlON was classified in water using Narlex LD-45 dispersant. FIG. 9 is a photomicrograph of the particles from the 2.0-3.0 micrometer fraction, demonstrating their relatively narrow size range. FIG. 10 shows the classified SiAlON particles from the 0.1-3.0 micrometer cut. The very fine particles of FIG. 11 are less than 0.1 micrometer.

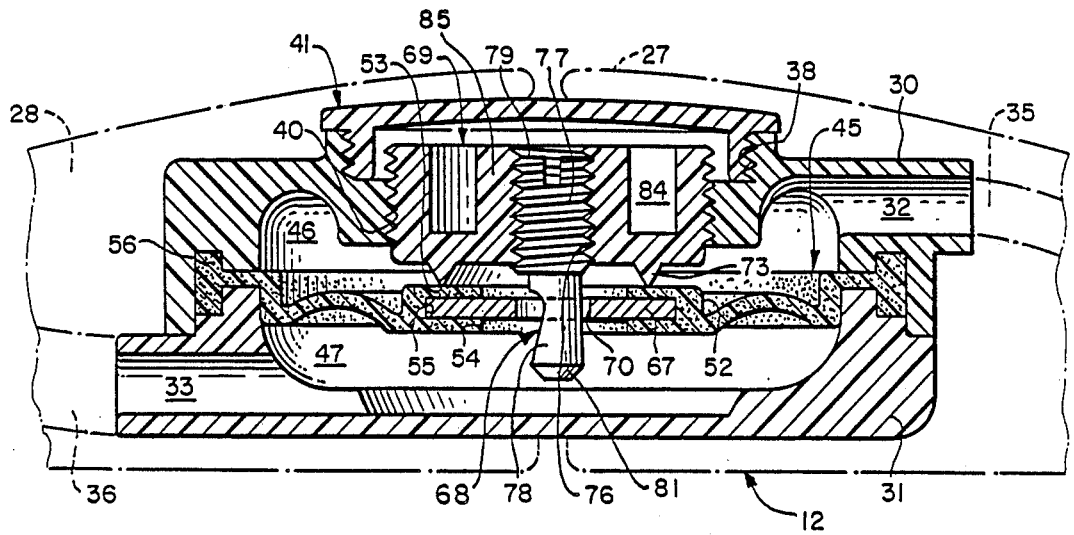

What is claimed is:

1. A multi-component semi-continuous system for the classification of colloids in a liquid suspension, comprising:
    (i) an array of units, including a first unit and a second unit for classifying suspended colloids, each unit including a centrifuge device having a colloids input and a fines output and also including a static fluid layer in the bowl of each centrifuge device adjacent the bowl wall and rotating along with the bowl;
    (ii) transport means for transporting the fines output of the centrifuge device in the first unit to the colloid input of the centrifuge device in the second unit, so that colloids can be transported therebetween;
    (iii) dispersion means for subjecting a mixture of colloids and liquid to mechanical energy to provide a well-dispersed suspension of the colloids in the liquid;
    (iv) first control means for regulating a mass flow rate through the colloidal input of each unit; and
    (v) second control means for regulating a rotation rate of each centrifuge device, the first control means and the second control means effective to provide a sub-micron classification fraction of the colloids in at least one of the units.

2. A system according to claim 1, wherein at least one of the centrifuge devices has:
    (a) monitoring the means for ongoing monitoring of mass flow rates; and
    (b) controlling means for adjusting centrifuge speeds in response to the monitoring means, so as to achieve a desired set of operational rates and conditions.

3. A system according to claim 2, wherein the transport means includes bowl waste means for recycling liquid remaining in the centrifuge devices after classification.

4. A system according to claim 2, wherein the system includes last and next-to-last units in the array, the system further comprising:
    (iii) flocculation means for flocculating particulate matter present in the fines output of the next-to-last unit so as to produce flocculated particulate matter; and
    (iv) flocculation transport means for transporting the flocculated particular matter to the centrifuge device in the last unit.

5. A system according to claim 4, further comprising:
    (v) molecular seive means for removing water from non-aqueous liquid separated from the flocculated particulate matter; and
    (vi) third transport means for connecting the molecular seive means to the last centrifuge device, and for transporting the liquid separated form the flocculated particulate matter to the molecular seive.

6. The system defined by claim 1, wherein the first control means operates in real-time.

7. The system defined by claim 1, wherein the second control means operates in real-time.

8. A method for the classification of colloids, comprising:
    (i) providing a well-dispersed suspension of colloids in a liquid by subjecting a mixture of the colloids and the liquid to mechanical energy for a time effective to disperse the colloids throughout the liquid;

(ii) providing an array of units, including a first unit and a second unit for classifying the colloids in the well-dispersed suspension, each unit including a centrifuge device having a colloid input and a fines output;

(iii) providing a static liquid layer in the bowl of each centrifuge device, including the steps of (a) activating the centrifuge devices so that each device rotates at a desired rate and (b) introducing liquid into each device, such that the liquid forms a layer rotating along with the bowl;

(iv) introducing the well-dispersed suspension of colloids into the colloid input of the rotating centrifuge device of the first unit having a static layer in the bowl thereof;

(v) transporting an effluent from the fines output of the centrifuge device of the first unit to the colloid input of the centrifuge device of the second unit;

(vi) controlling a mass flow rate through each colloid input; and (vii) controlling the rotation rate of each centrifuge device, the control of each mass flow rate and each rotation rate effective to provide a sub-micron classification fraction of the colloids in at least one of the units.

9. The method defined by claim 8, wherein the controlling of the flow rate further includes monitoring the mass flow rate through each colloid input.

10. The method defined by claim 9, further including controlling the rate of rotation of a centrifuge device in response to a monitored mass flow rate.

11. The method defined by claim 8, wherein the array includes ultimate and penultimate units, further comprising:

(viii) flocculating colloids in an effluent of the fines output of the penultimate unit;

(ix) transporting the flocculated effluent to the colloid input of the ultimate unit; and (x) recovering the flocculated colloids in the ultimate unit.

12. The method defined by claim 8, wherein the controlling of the mass flow rate occurs in real-time.

13. The method defined by claim 8, wherein the controlling of the rotation rate occurs in real-time.

* * * * *

United States Patent [19]

Hooven

[11] Patent Number: 4,781,672

[45] Date of Patent: * Nov. 1, 1988

[54] THREE STAGE IMPLANTABLE FLOW CONTROL VALVE WITH IMPROVED VALVE CLOSURE MEMBER

[75] Inventor: Michael D. Hooven, Valencia, Calif.

[73] Assignee: Cordis Corporation, Miami, Fla.

[ * ] Notice: The portion of the term of this patent subsequent to Dec. 22, 2004 has been disclaimed.

[21] Appl. No.: 922,079

[22] Filed: Oct. 21, 1986

[51] Int. Cl.$^4$ ............................................. A61M 27/00

[52] U.S. Cl. ............................................. 604/9; 137/508; 604/247

[58] Field of Search .............. 137/504, 508, 510, 859, 137/845; 604/8-10, 247

[56] References Cited

U.S. PATENT DOCUMENTS

| | | | |
|---|---|---|---|
| 28,722 | 6/1860 | Whitacker | 137/508 |
| 79,436 | 6/1868 | Bechtel | 137/508 |
| 1,139,455 | 5/1915 | Gase | 137/508 |
| 1,159,214 | 11/1915 | Gueux | 137/508 |
| 1,199,152 | 9/1916 | Bruce | 137/508 |
| 1,468,434 | 9/1923 | Zander | |
| 2,207,382 | 7/1940 | McNamara | 277/21 |
| 2,290,151 | 7/1942 | McCollum | 237/12.3 |
| 2,969,066 | 1/1961 | Holter et al. | 128/350 |
| 3,109,429 | 11/1963 | Schwartz | 128/350 |
| 3,233,610 | 2/1966 | Wade | 128/350 |
| 3,270,771 | 9/1966 | Morgan | 137/525.3 |
| 3,288,142 | 11/1966 | Hakim | 128/350 |
| 3,308,798 | 3/1967 | Snider | 123/119 |
| 3,492,996 | 2/1970 | Fountain | 128/350 |
| 3,566,875 | 3/1971 | Stoehr | 128/350 |
| 3,601,128 | 8/1971 | Hakim | 128/350 |
| 3,633,605 | 1/1972 | Smith | 137/859 |
| 3,654,932 | 4/1972 | Newkirk et al. | 128/350 V |
| 3,674,050 | 7/1972 | Kuffer et al. | 137/536 |
| 3,683,929 | 8/1972 | Holter | 128/350 V |
| 3,756,243 | 9/1973 | Schulte | 128/350 V |
| 3,768,508 | 10/1973 | Schulte | 137/522 |
| 3,769,982 | 11/1973 | Schulte | 128/350 |
| 3,782,410 | 1/1974 | Steuby | 137/496 |
| 3,804,113 | 4/1974 | Garcea | 137/496 |
| 3,827,439 | 8/1974 | Schulte et al. | 128/350 |
| 3,886,948 | 6/1975 | Hakim et al. | 128/350 V |
| 3,886,968 | 6/1975 | Murrell | 137/504 X |
| 3,889,687 | 6/1975 | Harris | 128/350 V |
| 3,901,245 | 8/1975 | Spitz et al. | 128/350 V |
| 3,924,635 | 12/1975 | Hakim | 128/350 V |
| 3,970,105 | 7/1976 | Pelton et al. | 137/498 |
| 3,985,140 | 10/1976 | Harris | 128/350 V |
| 3,991,768 | 11/1976 | Portnoy | 128/350 |
| 3,999,553 | 12/1976 | Spitz | 128/350 |
| 4,103,689 | 8/1978 | Leighton | 128/350 V |
| 4,106,510 | 8/1978 | Hakim et al. | 128/350 V |
| 4,156,422 | 5/1979 | Hildebrandt et al. | 128/748 |
| 4,167,952 | 9/1979 | Reiniecke | 137/493 |
| 4,215,695 | 8/1980 | Spitz et al. | 128/350 |
| 4,246,930 | 1/1981 | Bishop | 137/493.9 |
| 4,332,255 | 6/1982 | Hakim et al. | 128/350 |
| 4,340,038 | 7/1982 | McKean | 128/1.3 |
| 4,437,493 | 3/1984 | Okuda et al. | 138/45 |
| 4,443,214 | 4/1984 | Marion | 604/9 |
| 4,452,423 | 6/1984 | Bevlavi | 251/65 |
| 4,540,400 | 9/1985 | Hooven | 604/247 X |
| 4,624,286 | 11/1986 | Frohn | 137/859 |
| 4,627,832 | 12/1986 | Hooven et al. | 604/247 X |
| 4,714,458 | 12/1987 | Hooven | 604/9 |

Primary Examiner—Dalton L. Truluck
Attorney, Agent, or Firm—Lockwood, Alex, FitzGibbon & Cummings

[57] ABSTRACT

An implantable valve for controlling the passage of cerebrospinal fluid (CSF) from a ventricle of the brain to a suitable drainage location in the body includes a movable diaphragm responsive to pressure differentials between the ventricle and the drainage location. When the pressure differential is below a minimum threshold level, the valve is closed and CSF flow is prevented. When the pressure differential increases beyond the minimum threshold, the valve operates in a constant pressure mode to maintain a first predetermined CSF pressure differential across the valve. When the differential pressure increases beyond an intermediate threshold level, the valve operates in a flow control mode to maintain a desired CSF flow rate through the valve. When the pressure differential increases beyond a maximum threshold level, the valve operates in a constant pressure mode to maintain a second predetermined CSF pressure differential across the valve. To provide for the various valve operating modes, the valve includes a valve stem and a valve closure member, which coact with a valve seat carried on the diaphragm. The valve closure member defines an annular valving surface which coacts with the diaphragm to provide improved fluid control at low differential pressures.

13 Claims, 4 Drawing Sheets